(12) United States Patent
Okada et al.

(10) Patent No.: US 10,370,552 B2
(45) Date of Patent: Aug. 6, 2019

(54) NEAR-INFRARED ABSORBING FINE PARTICLE DISPERSION LIQUID AND METHOD FOR PRODUCING THE SAME

(71) Applicant: SUMITOMO METAL MINING CO., LTD., Tokyo (JP)

(72) Inventors: Mika Okada, Isa (JP); Hideaki Fukuyama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/546,989

(22) PCT Filed: Jan. 27, 2016

(86) PCT No.: PCT/JP2016/052401
§ 371 (c)(1),
(2) Date: Jul. 27, 2017

(87) PCT Pub. No.: WO2016/121843
PCT Pub. Date: Aug. 4, 2016

(65) Prior Publication Data
US 2018/0016460 A1    Jan. 18, 2018

(30) Foreign Application Priority Data
Jan. 27, 2015  (JP) ................. 2015-013423

(51) Int. Cl.
*C09D 17/00*   (2006.01)
*C09K 3/00*    (2006.01)

(52) U.S. Cl.
CPC ........... *C09D 17/007* (2013.01); *C09D 17/00* (2013.01); *C09K 3/00* (2013.01)

(58) Field of Classification Search
USPC .......................... 252/587; 359/258; 428/323
See application file for complete search history.

(56) References Cited

U.S. PATENT DOCUMENTS

| | | | |
|---|---|---|---|
| 2005/0136243 A1* | 6/2005 | Fisher | B32B 17/10 428/323 |
| 2006/0178254 A1 | 8/2006 | Takeda et al. | |
| 2009/0116100 A1* | 5/2009 | Ota | G02B 5/24 359/358 |
| 2011/0272646 A1 | 11/2011 | Meyer | |
| 2014/0023860 A1 | 1/2014 | Kodaira et al. | |

FOREIGN PATENT DOCUMENTS

| | | |
|---|---|---|
| EP | 2690145 A1 | 1/2014 |
| JP | H01-311177 A | 12/1989 |
| JP | 2006-143778 A | 6/2006 |
| JP | 2008-291167 A | 12/2008 |
| JP | 4626284 B2 | 2/2011 |
| JP | 2013-112791 A | 6/2013 |
| JP | 2013-526625 A | 6/2013 |
| JP | 2015-117353 A | 6/2015 |
| WO | 2005/037932 A1 | 4/2005 |
| WO | 2012/128332 A1 | 9/2012 |
| WO | 2012/140896 A1 | 10/2012 |

OTHER PUBLICATIONS

Apr. 26, 2016 Search Report issued in International Patent Application No. PCT/JP2016/052401.
Apr. 26, 2016 Written Opinion issued in International Patent Application No. PCT/JP2016/052401.
May 30, 2018 Extended European Search Report issued in European Patent Application No. 16743446.3.

* cited by examiner

*Primary Examiner* — Monique R Peets
(74) *Attorney, Agent, or Firm* — Oliff PLC

(57) ABSTRACT

Provided is a near infrared absorbing fine particle dispersion liquid, which can be applied to a base material such as an acrylic resin base material having a low solvent resistance, including: a solvent of one or more kinds selected from petroleum-based solvents; near infrared absorbing fine particles of one or more kinds selected from 10 mass % more and 25 mass % or less of a composite tungsten oxide expressed by $M_xW_yO_z$, and/or a magneli phase expressed by the general formula $W_yO_z$; and a dispersant having a fatty acid in its structure and soluble in the solvent, wherein a viscosity is 180 mPa/S or less.

10 Claims, 2 Drawing Sheets

NEAR-INFRARED ABSORBING FINE PARTICLE DISPERSION LIQUID AND METHOD FOR PRODUCING THE SAME

TECHNICAL FIELD

The present invention relates to a near infrared absorbing fine particle dispersion liquid having an absorption ability in a near infrared region and capable of forming a film on a base material having a low solvent resistance such as acrylic resin and the like, and a method for producing the same.

DESCRIPTION OF RELATED ART

Various transparent base materials are adopted according to application such as glass, polycarbonate resin, acrylic resin, etc. as a window material for windows of buildings and vehicles. Among them, acrylic resin is excellent in transparency and durability, and it is lighter than glass, and therefore it is used as a window material for aircrafts and the like.

Meanwhile, along with a growing interest in an environment, there is a demand for a method for suppressing a temperature rise in rooms and cars to increase an efficiency of an air conditioner. As one countermeasure, it is considered to form an infrared ray absorbing layer on the abovementioned window material to impart a heat shielding performance.

As patent document 1, inventors of the present invention disclose composite tungsten oxide fine particles expressed by a general formula $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$) fine particles, and a magneli phase expressed by the general formula $W_yO_z$ (W is tungsten, O is oxygen, satisfying $2.45 \leq z/y \leq 2.999$) fine particles, and which is a material having a high visible light transmittance and a near infrared absorbing function.

Patent Document 1: Patent Publication No. 4626284

SUMMARY OF THE INVENTION

Problem to be Solved by the Invention

From the abovementioned circumstances, it is also required to impart a heat shielding performance to acrylic resin window materials as well. However, acrylic resins are inferior in chemical resistance to other transparent base materials and are easily dissolved by highly invasive organic solvents.

However, the near infrared absorbing fine particles described in Patent Document 1 are dispersed in an organic solvent having a high invasiveness to acrylic resins such as toluene. Therefore, the near infrared absorbing fine particle dispersion liquid described in Patent Document 1 cannot be applied to acrylic resins having a low solvent resistance.

Under such a circumstance, the present invention is provided, and an object to be solved by the present invention is to provide a near infrared absorbing fine particle dispersion liquid having a low invasiveness to resins, and which can be applied to a base material such as acrylic resin having an infrared absorption ability, clear contrast, and a low solvent resistance to resins, and a method for producing the same.

Means for Solving the Problem

The inventors of the present invention attempt to add and disperse the near infrared absorbing fine particles such as composite tungsten oxide fine particles expressed by a general formula $M_xW_yO_z$, and/or tungsten oxide fine particles expressed by a general formula $W_yO_z$ and having a Magneli phase, into a petroleum-based solvent having a low invasiveness to resin.

However, even when it is attempted to replace the organic solvent described in Patent Document 1 with the petroleum-based solvent having low invasiveness to the resin, the ability of the petroleum-based solvent to disperse the near infrared absorbing fine particles is inferior to an organic solvent having a high invasiveness to resins such as toluene, and a viscosity of the near infrared absorbing fine particle dispersion liquid is increased. Then, as a result of increasing the viscosity of the near infrared absorbing fine particle dispersion liquid, there is a problem that a dispersed particle size of each near-infrared absorbing fine particle cannot be decreased to a predetermined value.

In order to solve the abovementioned problem, and as a result of intensive research by the inventors of the present invention, it is found that when 10 mass % or more and 25 mass % or less of the near infrared absorbing fine particles are added to a solvent of one or more kinds selected from petroleum-based solvents to thereby pulverize and disperse the near infrared ray absorbing fine particles, an increase in the viscosity of the dispersion can be suppressed by adding a dispersant having a fatty acid soluble in the petroleum-based solvent in its structure, and a near infrared absorbing fine particle dispersion liquid applicable to an acrylic resin or the like can be obtained. Thus, the present invention is completed.

Namely, in order to solve the abovementioned problem, according to a first invention, there is provided a near infrared absorbing fine particle dispersion liquid, including:

a solvent of one or more kinds selected from petroleum-based solvents;

10 mass % more and 25 mass % or less of near infrared absorbing fine particles of one or more kinds selected from a composite tungsten oxide expressed by $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$), and/or a tungsten oxide having a Magneli phase expressed by a general formula $W_yO_z$ (W is tungsten, O is oxygen, satisfying $2.45 \leq z/y \leq 2.999$); and a dispersant having a fatty acid in its structure, and soluble in the solvent, wherein a viscosity is 180 mPa/S or less.

According to a second invention, there is provided the near infrared absorbing fine particle dispersion liquid of the first invention, wherein an anchor portion of the dispersant has one or more kinds selected from a secondary amino group, a tertiary amino group, and a quaternary ammonium group.

According to a third invention, there is provided the near infrared absorbing fine particle dispersion liquid of the first or second invention, wherein the dispersant has an acid value of 1 mg KOH/g or more.

According to a fourth invention, there is provided the near infrared absorbing fine particle dispersion liquid of any one of the first to third inventions, wherein a dispersed particle size of each near infrared absorbing fine particle is 1 nm or more and 200 nm or less.

According to a fifth invention, there is provided the near infrared absorbing fine particle dispersion liquid of any one of the first to fourth inventions, wherein the near infrared ray absorbing fine particles expressed by MxWyOz have a hexagonal crystal structure or composed of a hexagonal crystal structure.

According to a sixth invention, there is provided the near infrared absorbing fine particle dispersion liquid of any one of the first to fourth inventions, wherein a surface of the near infrared absorbing fine particle is coated with a compound of one or more kinds selected from Si, Ti, Al, and Zr.

According to a seventh invention, there is provided the near infrared absorbing fine particle dispersion liquid of any one of the first to sixth inventions, wherein the $M_xW_yO_z$ is $Cs_xW_yO_z$ (0.25≤x/0.35, 2.2≤z/y≤3.0), and a lattice constant of the $Cs_xW_yO_z$ is 0.74060 nm or more and 0.74082 nm or less on the a-axis, and 0.76106 nm or more and 076149 nm or less on the c-axis.

According to an eighth invention, there is provided the near infrared absorbing fine particle dispersion liquid of any one of the first to seventh inventions, wherein the solvent is one or more kinds selected from petroleum-based solvents having an aniline point of 60° C. or more and 95° C. or less and a boiling point of 50° C. or more and 350° C. or less.

According to a ninth invention, there is provided a method for producing the near infrared absorbing fine particle dispersion liquid of any one of the first to eighth inventions, including:

mixing the near-infrared absorbing fine particles, the solvent and the dispersant; and dispersing the mixture in a wet medium mill.

Advantage of the Invention

The near-infrared absorbing fine particle dispersion liquid of the present invention can be formed on the surface of a base material having a low solvent resistance such as acrylic resin and can impart to the base material absorption ability in the near infrared region.

DETAILED DESCRIPTION OF THE INVENTION

Figure 1:
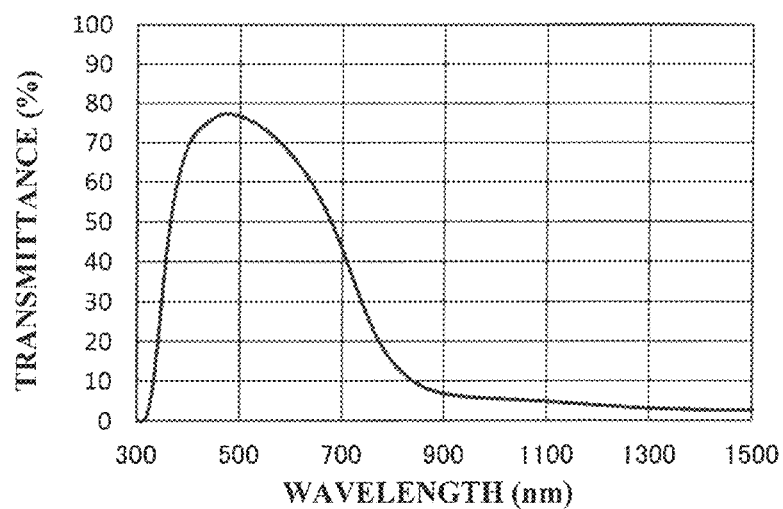
FIG. 1 is a light transmission profile of a dried film of a dispersion liquid A according to an example 1 of the present invention.

A mode for carrying out the present invention will be described in detail in an order of near infrared absorbing fine particles, a solvent, a dispersant, a method for dispersing the near infrared ray absorbing fine particles in the solvent, and a near infrared absorbing fine particle dispersion liquid.

1. Near Infrared Absorbing Fine Particles

The near infrared absorbing fine particles used in the present invention are one or more kinds selected from a composite tungsten oxide expressed by $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying 0.001≤x/y≤1, and 2.2≤z/y≤3.0), or a tungsten oxide having a Magneli phase expressed by a general formula $W_yO_z$ (W is tungsten, O is oxygen, satisfying 2.45≤z/y≤2.999).

Alkali metals are elements of Group 1 of a periodic table excluding hydrogen, alkaline earth metals are elements of Group 2 of the periodic table, rare earth elements are Sc, Y and lanthanoid elements.

In a case of the composite tungsten oxide expressed by $M_xW_yO_z$, element M is added in the near infrared absorbing fine particles used in the present invention. Therefore, free electrons are generated including a case of z/y=3.0, and an absorption property caused by free electrons are developed in a near infrared region, and such near infrared absorbing fine particles are effective as a near-infrared absorbing material in the vicinity of a wavelength of 1000 nm.

Particularly, from a viewpoint of improving optical properties and a weather resistance as a near infrared absorbing material, the element M is preferably one kind or more of Cs, Rb, K, Ti, In, Ba, Li, Ca, Sr, Fe and Sn, and the element M is further preferably Cs.

Further, in a case of $Cs_xW_yO_z$ (0.25≤x/y≤0.35, 2.2≤z/y≤3.0), a lattice constant is preferably 0.74060 nm or more and 0.74082 nm or less on the a-axis and 0.76106 nm or more and 0.76149 nm or less on the c-axis. When the lattice constant is within the above range, near infrared absorbing fine particles having particularly excellent optical properties and weather resistance can be obtained. The lattice constant can be obtained by conducting Rietveld analysis based on the data of an XRD pattern, for example.

Further, it is also preferable that the composite tungsten oxide is treated with a silane coupling agent. This is because excellent dispersibility can be obtained and an excellent near infrared absorbing function and transparency in the visible light region can be obtained.

When the value of y indicating an added amount of the element. M is larger than 0.001, a sufficient amount of free electrons is generated and a near-infrared absorption effect can be sufficiently obtained. As the added amount of the element M is increased, a supply amount of free electrons is increased and the near infrared absorption effect is also increased, but is saturated when the value of x/y is about 1. When the value of x is smaller than 1, formation of an impurity phase in a fine particle-containing layer can be avoided, which is preferable.

Next, the value of z/y indicating control of an oxygen amount is preferably 2.2.≤z/y≤3.0 and more preferably 2.45≤z/y≤3.0, because even in the composite tungsten oxide expressed by $M_xW_yO_z$, the same mechanism works as the abovementioned tungsten oxide expressed by WyOz, and in addition, there is a supply of free electrons by adding the abovementioned element M even in a case of z/y=3.0.

There is a case that the composite tungsten oxide or a part of oxygen atoms constituting the composite tungsten oxide is replaced with a halogen atom, which is derived from the composite tungsten oxide of the present invention or a raw material compound used for producing the tungsten oxide. However, there is no problem in implementing the present invention. Therefore, the composite tungsten oxide and the tungsten oxide of the present invention include a case that part of the oxygen atom is replaced with a halogen atom.

Further, when each composite tungsten oxide fine particle which is a near infrared absorbing fine particle has a hexagonal crystal structure, transmission of the fine particles in the visible light region is improved and absorption in the near infrared region is improved.

When cations of the element M are added and present in hexagonal voids, the transmission in the visible light region is improved and the absorption in the near infrared region is improved. Generally, when the element M having a large ionic radius is added, the hexagonal crystal is formed, and specifically, when Cs, K, Rb, Tl, In, Ba, Sn, Li, Ca, Sr, and Fe are added, the hexagonal crystal is likely to be formed. Of course, It is preferable that the added element M is present in hexagonal voids formed by $WO_6$ units, and the added element is not limited to the abovementioned elements.

When the composite tungsten oxide fine particle having the hexagonal crystal structure have a uniform crystal structure, the added amount of the additional element M is preferably from 0.2 to 0.5, more preferably from 0.30 to 0.35, and ideally 0.33 in terms of x/y. When the value of x/y is 0.33, it is considered that the additional element M is arranged in all of the hexagonal voids.

Further, tetragonal, cubic tungsten bronze also has the near infrared absorption effect, other than the hexagonal crystal. Then, due to these crystal structures, an absorption position in the near infrared region is likely to change, and the absorption position is likely to move to a long wavelength side in an order of cubic<tetragonal<hexagonal crystals. Accordingly, absorption in the visible light region is small in an order of hexagonal<tetragonal<cubic crystals. Therefore, hexagonal tungsten bronze is preferably used for applications in which light in the visible light region is transmitted and light in the near infrared region is absorbed.

Next, in the tungsten oxide expressed as $W_yO_z$, the so-called "Magneli phase" having a composition ratio expressed by $2.45 \leq z/y \leq 2.999$ is chemically stable, and the absorption property in the near infrared region is good, and therefore such tungsten oxide is preferable as the near infrared absorbing material.

The near infrared absorbing fine particles of the present invention largely absorb a light in the near infrared region, particularly around the wavelength of 1000 nm, and therefore a transmission color tone is blue to green in many cases. Further, the dispersed particle size of each fine particle of the near infrared absorbing material can be selected depending on the intended use. First, when used for applications of maintaining transparency, each fine particle of the near infrared absorbing material preferably has a dispersed particle size of 2000 nm or less. This is because when the dispersed particle size is 2000 nm or less, a difference between the bottom of the transmittance and the bottom of the absorption the near infrared region becomes large, and the effect as the near infrared absorbing material having transparency in the visible light region can be exhibited. Further, fine particles having a dispersed particle size smaller than 2000 nm do not completely shield a light by scattering, and visibility in the visible light region is maintained, and simultaneously, transparency can be maintained efficiently.

Further, when transparency is emphasized in the visible light region, preferably scattering of fine particles is taken into consideration. Specifically, the dispersed particle size of the near infrared absorbing fine particle is preferably 200 nm or less, and more preferably 100 nm or less. The reason is that scattering of light in the visible light region in a wavelength range of 400 nm to 780 nm due to geometric scattering or Mie scattering is reduced if the dispersed particle size is small, and as a result, it is possible to avoid a situation that the near infrared absorbing film becomes like a frosted glass and clear transparency cannot be obtained. Namely, when the dispersed particle size of the near infrared absorbing fine particle is 200 nm or less, the geometric scattering or the Mie scattering is reduced and the region becomes a Rayleigh scattering region. This is because in the Rayleigh scattering region, a scattered light is reduced in inverse proportion to the sixth power of the dispersed particle size, and therefore scattering is reduced as the dispersed particle size is decreased and the transparency is improved. Further, when the dispersed particle size is 100 nm or less, the scattered light is extremely reduced, which is preferable. From a viewpoint of avoiding scattering of light, it is preferable that the dispersed particle size is small. Meanwhile, when the dispersed particle size is 1 nm or more, industrial production is facilitated.

Further, the fact that the surface of the fine particle constituting the near infrared absorbing material of the present invention is covered with an oxide containing one or more kinds of Si, Ti, Zr and Al, is preferable from a viewpoint of improving the weather resistance of the near infrared absorbing material.

2. A Solvent

The solvent used in the present invention is preferably water-insoluble from a viewpoint of a drying speed. Use of the water-insoluble solvent is preferable because it can shorten the drying time compared with a case of using a water-soluble solvent and productivity is improved. Then, it is desired that the solvent has less invasiveness to resins such as acrylic resin and does not dissolve such resins.

Petroleum-based solvents are conceivable as solvents that satisfy the above requirements. Therefore, one or more kinds selected from petroleum-based solvents can be used as the solvent used in the present invention.

The petroleum-based solvent preferably has an aniline point of 70° C. or more, more preferably 70 to 95° C.

The petroleum-based solvent having an aniline point of 70° C. or more has low invasiveness to resins such as an acrylic resin and hardly dissolves them. In contrast, when the aniline point of the petroleum-based solvent is 95° C. or less, it exhibits solubility in a dispersant described later at the time of producing the near infrared absorbing fine particle dispersion liquid of the present invention, and high productivity can be ensured.

Further, when the boiling point of petroleum-based solvent is 50° C. or more, an amount of volatilization of the petroleum-based solvent is not excessive during pulverization and dispersion treatment applied to the near infrared ray absorbing fine particles, in the production of the near infrared absorbing fine particle dispersion liquid of the present invention, which is preferable from a viewpoint of handling. Meanwhile, when the boiling point of the petroleum-based solvent is 350° C. or less, this is preferable because a suitable drying property can be obtained when the near infrared absorbing fine particle dispersion liquid of the present invention is applied to the base material.

As the petroleum-based solvent having an aniline point in the range of 70 to 95° C. and a boiling point in the range of 50 to 350° C. described above, a solvent derived from a crude oil having an aromatic hydrocarbon content of 5 mass % or less can be mentioned.

As a specific example, in a case of a commercially available petroleum-based solvent, Isoper E, Exol Hexane, Exol Heptane, Exol E, Exol D 30, Exol D 40, Exol D 60, Exol D 80, Exol D 95, Exol D 110, Exol D 130 (all of them are manufactured by Exxon Mobil Corporation), can be mentioned.

3. A Dispersant

The dispersant for dispersing the near infrared absorbing fine particles in the solvent is preferably one having a structure of a fatty acid. Further, the dispersant is required to be soluble in the solvent of the present invention described above.

Further, the structure of the dispersant is not particularly limited, and it is preferable to have a polylactone structure or hydroxystearic acid chain. Further, as a dispersant having one or more kinds selected from a secondary amino group, a tertiary amino group and a quaternary ammonium group as an anchor portion described later, an ability to disperse the infrared absorbing fine particles of the present invention in the solvent of the present invention is high, which is preferable.

Further, when the acid value of the dispersant of the present invention is 1 mg KOH/g or more, the ability to disperse the abovementioned infrared absorbing fine particles is high, which is preferable.

In the present invention, the anchor portion is a portion in a molecule constituting the dispersant and is a portion which adsorbs on the surface of the near infrared absorbing fine particle or a pigment.

Then, it is preferable to use a polymer dispersant having a basic anchor portion as the dispersant of the present invention. This is because by using particularly the polymer dispersant having the basic anchor portion, storage stability of an ink to be produced is improved, which is preferable.

Figure 2:
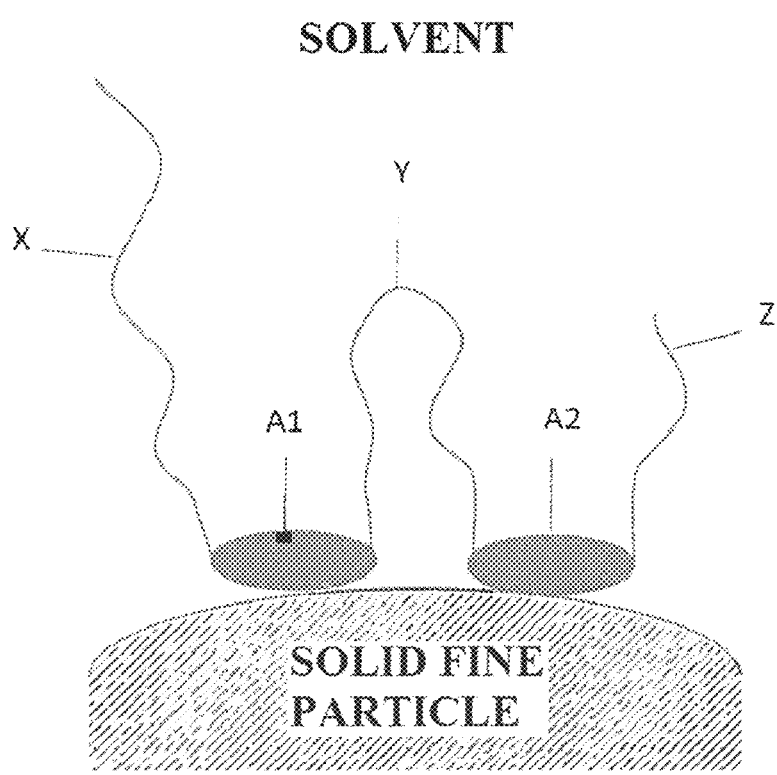
FIG. 2 is a schematic view of a dispersant according to the present invention.

An aspect of the polymer dispersant used in the present invention is shown in FIG. 2. In the general formula [X-A1-Y-A2-Z]. A1 and A2 are portions (anchor portions) which are adsorbed on solid fine particles such as the near infrared absorbing fine particles and the pigment. In the anchor portion, its structure is not particularly limited as long as it has at least one point (adsorption point) to be adsorbed on each solid fine particle, and has a chain, cyclic, or fused polycyclic shape, or a combination thereof for example. Further, A1 and A2 may be the same or different. On the other hand, X, Y and Z are polymer chain portions which are solvated, and solved and spread out from the surface of the solid fine particle into a liquid, and hereinafter, X and Z are referred to as tail portions and Y is referred to as a loop portion. In the tail portions and the loop portion, a homopolymer composed of a single monomer and a copolymer composed of plural monomers are used.

Further, as the polymer dispersant used in the present invention, a substance having no loop portion (Y) in the general formula [X-A1-Y-A2-Z], can be used, which is synonymous with the general formula [X-A1-A2-Z].

Figure 3:
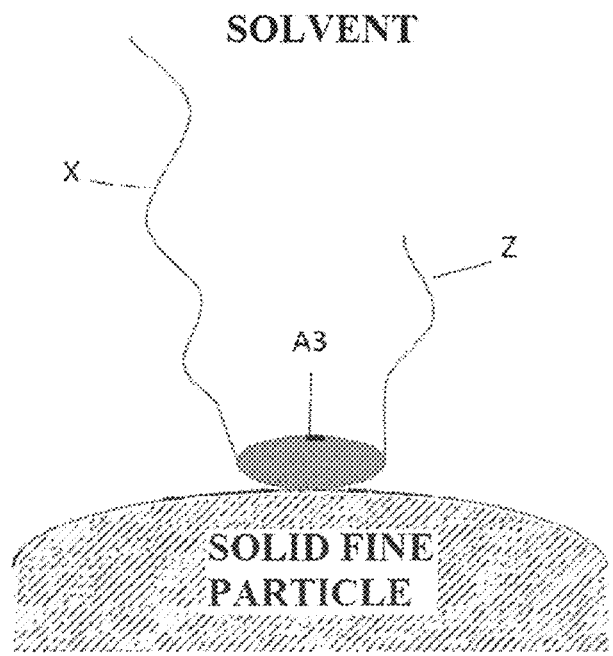
FIG. 3 is a schematic view of a dispersant according to different aspect of the present invention.

Still further, FIG. 3 shows an aspect of the dispersant of the present invention. It is also possible to use the dispersant in which the loop portion (Y) does not exist and the tail portion (X, Z) is bonded to one another anchor portion (A3). In this case, the general formula is [X-A3-Z].

Figure 4:
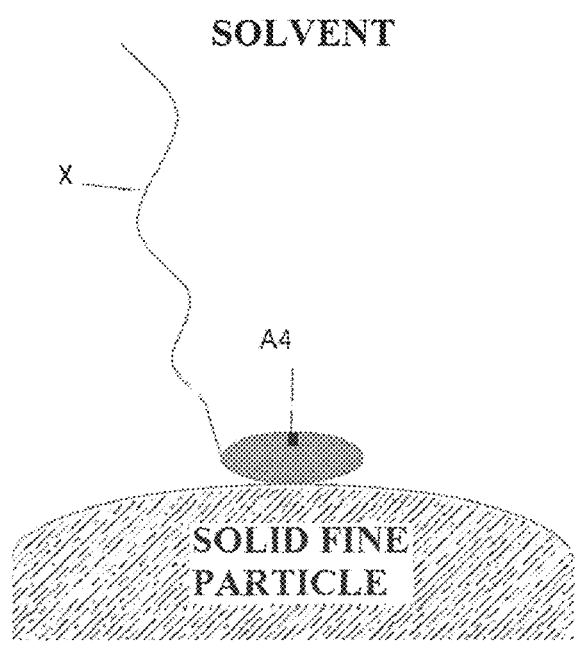
FIG. 4 is a schematic view of a dispersant according to still another aspect of the present invention.

In addition, as an aspect of the dispersant of the present invention, it is also possible to use the dispersant having no tail portion (Z) and having one tail portion (X) bonded to one anchor portion (A4) as shown in FIG. 4. In this case, the general formula is [X-A4].

A 1, A 2, A 3, A 4 constituting the dispersant according to the present invention, have at least one functional group (adsorption point) that exerts adsorption interaction with the surface of the solid fine particle by hydrogen bonding, acid/base interaction, or the like. Further, as described above, A1 and A2 may be the same as each other or may be different from each other, A1 and A2 having the same functional group as the functional group (adsorption point) that exerts adsorption interaction are preferable, in consideration of the adsorptivity of the solid fine particles to the surface. Further, it is preferable that A1 and A2 are the same from a viewpoint of the ease of producing the polymer dispersant.

The molecular chains X, Y and Z constituting the dispersant of the present invention may be composed of different chemical species and at least two of them may be composed of the same chemical species. The tail portion (X, Z) and the loop portion (Y) of the molecular chain are portions which are solvated and spread from the surface of the solid fine particle to be dissolved in the solvent, and therefore a molecular chain having an affinity with the solvent is used.

The dispersant of the present invention exhibits a dispersion ability enabling the viscosity of the dispersion liquid to be maintained at 180 mPa/S or less, when 10 mass % or more and 25 mass % or less of the composite tungsten oxide and/or tungsten oxide of the present invention are added to the solvent composed of one or more petroleum solvents, which is then dispersed to obtain a dispersion liquid.

The reason is as follows. As a result of maintaining the viscosity of the dispersion at 180 mPa/S or less, pulverization and dispersion proceed sufficiently in the composite tungsten oxide fine particles and/or the tungsten oxide. Then, as a result of the fact that the viscosity of the dispersion is maintained at 180 mPa/S or less, in the produced near infrared absorbing fine particle dispersion liquid, the dispersed particle size of the composite tungsten oxide and/or the tungsten oxide can be made 200 nm or less.

Specific examples of preferable dispersants include commercially available dispersants such as: DISPERBYK 142; Disperbyk 160, Disperbyk 161, Disperbyk 162, Disperbyk 163, Disperbyk 166, Disperbyk 170, Disperbyk 180, Disperbyk 182, Disperbyk 184, Disperbyk 190, Disperbyk 2155 (All manufactured by BYK Japan K.K.); EFKA-46, EFKA-47, EFKA-48, EFKA-49 (all manufactured by BASF); Polymer 100, polymer 120, polymer 150, polymer 400, polymer 401, polymer 402, polymer 403, polymer 450, polymer 451, polymer 452, polymer 453 (all manufactured by EFKA Chemical Co.); SOLSPERSE 11200, Solsperse 13940, Solsperse 16000, Solsperse 17000, Solsperse 18000, Solsperse 20000, Solsperse 24000, Solsperse 27000, Solsperse 28000, Solsperse 32000, Solsperse 33000, Solsperse 39000, Solsperse 56000, Solsperse 71000 (all manufactured by Kao Corporation); Solplus D 530, Solplus DP 320, Solplus L 300, Solplus K 500, Solplus R 700 (all manufactured by Lubrizol Japan Ltd.); Ajisper PB 711, Ajisper PA 111, Ajisper PB 811, Ajisper PW 911 (all manufactured by Ajinomoto Co., Ltd,); and Floren DOPA-15, Floren DOPA-22, Floren DOPA-17, Floren TG-730 W, Floren G-700, Floren TG-720 W (all manufactured by Kyoeisha Chemical Industry Co., Ltd.).

The addition amount of the dispersant of the present invention is preferably 30 parts by weight or more and 200 parts by weight or less based on 100 parts by weight of the near infrared absorbing fine particles.

Further, in a case of using a commercially available dispersant, it is preferable that the dispersant does not contain a solvent that may dissolve acrylic resin or the like. Accordingly, a nonvolatile content (after heating at 180° C. for 20 minutes) of the dispersant is preferably high, for example, preferably 95% or more.

4. A Method for Dispersing the Near Infrared Absorbing Fine Particles in the Solvent In the dispersion method for obtaining the near infrared absorbing fine particle dispersion liquid by dispersing the near infrared absorbing fine particles of the present invention in the solvent of the present invention, can be arbitrarily selected as long as this is a method for evenly dispersing the fine particles in the solvent. Specifically, it is preferable to use a wet medium mill such as a bead mill or a ball mill.

The concentration of the near infrared absorbing fine particles in the near-infrared absorbing fine particle dispersion liquid of the present invention is 10 to 25 mass %, preferably 15 to 25 mass %, and more preferably 20 to 25 mass %.

The higher the concentration of the near infrared absorbing fine particles is, the easier it is to adjust the coating liquid, which is preferable. In contrast, when the concentration of the near infrared absorbing fine particles is 25 mass % or less, the infrared absorbing fine particles can be pulverized and dispersed sufficiently by suppressing the viscosity of the obtained near infrared ray absorbing fine particle dispersion liquid to 180 mPa/S or less by adding the abovementioned dispersant of the present invention. In this case, the dispersed particle size of the near infrared absorbing fine particles can be arbitrarily controlled by the treatment time of the wet medium mill. For example, by increasing the treatment time, the dispersed particle size can be made small.

By the production method described above, the near infrared absorbing fine particle dispersion of the present invention is obtained.

EXAMPLE

Hereinafter, the present invention will be specifically described with reference to examples, but the present invention is not limited to these examples.

The acid value of the dispersant of this example is measured by a potentiometric titration method in accordance with JIS K 0070.

On the other hand, the optical properties of the near infrared absorbing film of this example were measured using a spectrophotometer U-4000 (manufactured by Hitachi, Ltd.). In addition, the visible light transmittance of the near infrared ray absorbing film of this example was measured in accordance with JIS R 3106.

Example 1

23 mass % of hexagonal $Cs_{0.33}WO_3$ (a-axis: 0.74072 nm, c-axis: 0.76131 nm) which is a composite tungsten oxide as near infrared absorbing fine particles, 11.5 mass % of a dispersant having a fatty acid in its structure, having an acid value of 20.3 mg KOH/g, having hydroxystearic acid chain and having a nonvolatile content of 100% (abbreviated as a dispersant a hereafter), 65.5 mass % of Exol D80 (boiling point: 205° C., aniline point: 79° C.) were weighed.

These near infrared absorbing fine particles, dispersing agent, and solvent were charged in a paint shaker containing 0.3 mmφ $ZrO_2$ beads, pulverized and dispersed for 40 hours, to thereby obtain a Infrared absorbing fine particle dispersion liquid (abbreviated as a dispersion liquid A hereafter) of example 1.

The dispersed particle size of the composite tungsten oxide fine particles in the dispersion liquid A was measured with a particle size distribution meter (manufactured by Otsuka Electronics Co., Ltd.) and it was found to be 81 nm.

The results are shown in table 1 (hereinafter, the same is applied to comparative examples 1 and 2).

An acrylic resin substrate having a thickness of 3 mm was prepared as a substrate to be printed, and a dispersion liquid A was applied to the surface thereof with a bar coater to a thickness of 8 μm. This film was dried at 70° C. for 10 minutes to thereby dry the dispersion liquid A.

The visible light transmittance of the obtained dried film of the dispersion liquid A was 71.5%. Further, The transmittance of a light having a wavelength of 550 nm was 73.2% in a visible light region, the transmittance of a light having a wavelength of 800 nm was 14.7%, the transmittance of a light having a wavelength of 90 nm was 6.8%, the transmittance of a light having a wavelength of 1000 nm was 5.5%, and the transmittance of a light having a wavelength of 1500 nm was 2.6% in a near infrared region. The light transmission profile of the dried film of this dispersion liquid A is shown in FIG. 1.

Comparative Example 1

As near infrared ray absorbing fine particles, 15.0 mass % of hexagonal $Cs_{0.33}WO_3$ which is the same composite tungsten oxide as in example 1, 12.0 mass % of an acrylic dispersant having a carboxyl group as a functional group (abbreviated as a dispersant b hereafter), and 73.0 mass % of toluene (boiling point: 110° C., aniline point: 10° C.) were mixed, and pulverized and dispersed for 10 hours with a paint shaker containing 0.3 mmφ $ZrO_2$ beads, to thereby obtain a composite tungsten oxide fine particle dispersion liquid (abbreviated as a dispersion liquid B hereafter).

The dispersion particle size of the tungsten oxide fine particles in the dispersion liquid B was measured with a particle size distribution meter (manufactured by Otsuka Electronics Co., Ltd.), and it was found to be 65 nm.

A polycarbonate resin substrate having a thickness of 3 mm was prepared as a substrate to be printed, and the dispersion liquid B was applied on the surface thereof with a bar coater to a thickness of 8 μm. However, an amount of toluene contained in the dispersion liquid B was 73.0 mass %. Therefore, it was difficult for the toluene to dissolve the polycarbonate resin base material and to apply the dispersion liquid B on the polycarbonate resin base material.

Comparative Example 2

As near infrared absorbing fine particles, 15.0 mass % of hexagonal $Cs_{0.33}WO_3$ which is the same composite tungsten oxide as in example 1, 12.0 mass % of an acrylic dispersant (abbreviated as a dispersant c hereafter) having a carboxyl group as a functional group, 73.0 mass % of mineral spirit (boiling point: 144° C., aniline point: 53° C.) were weighed, and pulverized and dispersed with a paint shaker containing 0.3 mmφ $ZrO_2$ beads for 10 hours, to thereby obtain a composite tungsten oxide fine particle dispersion liquid (abbreviated as a dispersion C hereafter).

The dispersed particle size of each tungsten oxide fine particle in the dispersion C was measured with a particle size distribution meter (manufactured by Otsuka Electronics Co., Ltd.), and it was found to be 72 nm.

An acrylic resin base material having a thickness of 3 mm was prepared as a substrate to be printed, and the dispersion C was applied to the surface thereof with a bar coater to a thickness of 8 μm. However, the amount of mineral spirit contained in the dispersion liquid C was 73.0 mass %. Therefore, the mineral spirit dissolved the acrylic resin base material, and it was difficult to apply the dispersion liquid C on the acrylic resin base material.

Evaluation of Example 1 and Comparative Examples 1 and 2

The dispersion liquid A of example 1 was obtained by dispersing the near infrared absorbing fine particles in the petroleum-based solvent having a high aniline point. By applying the dispersion liquid A on the acrylic resin base material, a near infrared absorbing film can be formed on the surface of the acrylic resin base material. The acrylic resin base material having the near infrared absorbing film formed on the surface shows a high transmittance for light in the visible light region, and the transmittance of the light in the near infrared region is remarkably low.

In contrast, the dispersion liquids B and C of comparative examples 1 and 2 contained a solvent having a low aniline point and dissolved an acrylic resin base material, a polycarbonate resin base material and the like. Therefore, It was found that the dispersion liquids B and C were unsuitable as the near infrared absorbing fine particle dispersion liquid to be applied on the surface of a resin base material having a low solvent resistance.

TABLE 1

| | Raw material | | | | | | Optical property | | | | | |
|---|---|---|---|---|---|---|---|---|---|---|---|---|
| | CWO | Dispersant | | | Solvent | | A | Transmittance in each wavelength | | | | |
| | content (Mass %) | Kind | Acid value (mgKOH/g) | Content (Mass %) | Kind | Content (Mass %) | B (nm) | C (%) | 550 nm (%) | 800 nm (%) | 900 nm (%) | 1000 nm (%) | 1500 nm (%) |
| Ex. 1 | 23 | a | 20.3 | 11.5 | Exol D80 | 65.5 | 81 | 71.5 | 73.2 | 14.7 | 6.8 | 5.5 | 2.6 |
| Com. Ex. 1 | 15 | b | — | 12.0 | Toluene | 73.0 | 65 | — | — | — | — | — | — |
| Com. Ex. 2 | 15 | c | — | 12.0 | Mineral Spirit | 73.0 | 72 | — | — | — | — | — | — |

CWO: Composite tungsten oxide fine particle
a: A dispersant having a fatty acid in its structure, having an acid value of 20.3 mg KOH, having a hydroxystearic acid chain and having a nonvolatile content of 100%
b: An acrylic dispersant having a carboxyl group as a functional group
c: An acrylic dispersant having a carboxyl group as a functional group
A = Physical property
B = CWO dispersed particle size
C = Visible light transmittance
Ex. = Example
Com. Ex. = Comparative Example

The invention claimed is:

1. A near infrared absorbing fine particle dispersion liquid, comprising:
   a solvent of one or more kinds selected from petroleum-based solvents;
   near infrared absorbing fine particles of one or more kinds selected from 10 mass % more and 25 mass % or less of a composite tungsten oxide expressed by MxWyOz (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$), and/or a tungsten oxide having a Magneli phase expressed by a general formula WyOz (W is tungsten, O is oxygen, satisfying $2.45 \leq z/y \leq 2.999$); and
   a dispersant having a fatty acid in its structure, and soluble in the solvent,
   wherein a viscosity is 180 mPa·S or less,
   the solvent is one or more solvents selected from petroleum-based solvents having an aniline point of 60° C. or more and 95° C. or less and a boiling point of 50° C. or more and 350° C. or less, and
   the structure of the dispersant has a polylactone structure or a hydroxystearic acid chain.

2. The near infrared absorbing fine particle dispersion liquid according to claim 1, wherein an anchor portion of the dispersant has one or more kinds selected from a secondary amino group, a tertiary amino group, and a quaternary ammonium group.

3. The near infrared absorbing fine particle dispersion liquid according to claim 1, wherein the dispersant has an acid value of 1 mg KOH/g or more.

4. The near infrared absorbing fine particle dispersion liquid according to claim 1, wherein a dispersed particle size of each near infrared absorbing fine particle is 1 nm or more and 200 nm or less.

5. The near infrared absorbing fine particle dispersion liquid according to claim 1, wherein the near infrared ray absorbing fine particles expressed by MxWyOz have a hexagonal crystal structure or composed of a hexagonal crystal structure.

6. The near infrared absorbing fine particle dispersion liquid according to claim 1, wherein a surface of the near infrared absorbing fine particle is coated with a compound of one or more kinds selected from Si, Ti, Al, and Zr.

7. The near infrared absorbing fine particle dispersion liquid according to claim 1, wherein the MxWyOz is CsxWyOz ($0.25 \leq x/y \leq 0.35$, $2.2 \leq z/y \leq 3.0$), and a lattice constant of the CsxWyOz is 0.74060 nm or more and 0.74082 nm or less on the a-axis, and 0.76106 nm or more and 0.76149 nm or less on the c-axis.

8. The near infrared absorbing fine particle dispersion liquid according to claim 1, wherein the solvent is one or more solvents selected from petroleum-based solvents having an aniline point of 70° C. or more and 95° C. or less and a boiling point of 50° C. or more and 350° C. or less, and an aromatic hydrocarbon content of 5 mass % or less.

9. A method for producing the near infrared absorbing fine particle dispersion liquid according to claim 1, comprising:
   mixing the near-infrared absorbing fine particles, the solvent and the dispersant; and
   dispersing the mixture in a wet medium mill.

10. The near infrared absorbing fine particle dispersion liquid according to claim 1, wherein an addition amount of the dispersant is 30 parts by weight or more and 200 parts by weight or less based on 100 parts by weight of the near infrared absorbing fine particles.

* * * * *